United States Patent
Agombar et al.

(10) Patent No.: US 10,162,706 B2
(45) Date of Patent: Dec. 25, 2018

(54) DECLUSTERED RAID ARRAY HAVING REDUNDANT DOMAINS

(71) Applicant: International Business Machines Corporation, Armonk, NY (US)

(72) Inventors: John P. Agombar, Winchester (GB); Ian Boden, Southampton (GB); Gordon D. Hutchison, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 228 days.

(21) Appl. No.: 14/874,802

(22) Filed: Oct. 5, 2015

(65) Prior Publication Data

US 2017/0097871 A1    Apr. 6, 2017

(51) Int. Cl.
*G06F 11/00* (2006.01)
*G06F 11/10* (2006.01)

(52) U.S. Cl.
CPC ...... *G06F 11/1092* (2013.01); *G06F 11/1088* (2013.01)

(58) Field of Classification Search
CPC ...... G06F 3/0619; G06F 3/0638; G06F 3/064; G06F 3/0643; G06F 3/0644; G06F 3/065; G06F 3/0683–3/0689; G06F 11/1092
See application file for complete search history.

(56) References Cited

U.S. PATENT DOCUMENTS

| | | | |
|---|---|---|---|
| 6,412,054 B1 * | 6/2002 | Bhatia | G06F 3/0611 707/999.002 |
| 8,099,623 B1 | 1/2012 | Li et al. | |
| 8,677,063 B2 | 3/2014 | Becker-Szendy et al. | |
| 9,009,524 B2 | 4/2015 | Tucek et al. | |
| 9,626,246 B1 * | 4/2017 | Parkhurst | G06F 11/1076 |
| 2014/0068184 A1 | 3/2014 | Edwards et al. | |
| 2014/0250269 A1 | 9/2014 | Shanbhag et al. | |
| 2016/0092109 A1 * | 3/2016 | Wu | G06F 3/061 711/114 |

* cited by examiner

*Primary Examiner* — Michael Maskulinski
(74) *Attorney, Agent, or Firm* — L. Jeffrey Kelly (57) ABSTRACT

Embodiments of the present invention disclose a method, computer program product, and system for managing a RAID array of data storage devices. The declustered RAID array is configured to tolerate a predetermined number of failing data storage devices. The declustered RAID array of data storage devices is split into a plurality of regions, each of the plurality of regions is divided into a plurality of sets, and each of the sets of the plurality of sets utilizes a different combination of the data storage devices. The declustered RAID array provisions a plurality of LUNs from respective sets of each of the plurality of regions, and in response to a failure of one or more of the plurality of data storage devices, up to the predetermined number of failing data storage devices, the RAID array rebuilds at least one copy of each of the plurality of virtual LUNs.

9 Claims, 5 Drawing Sheets

DECLUSTERED RAID ARRAY HAVING REDUNDANT DOMAINS

BACKGROUND

The present invention relates generally to the field of arrays of redundant array independent disk (RAID) data storage devices, and more particularly to utilizing a plurality of sets of data storage devices, each of the sets using different combinations of the data storage devices to improve rebuild performance.

RAID is used as an umbrella term for computer data storage configurations that divide user data and redundancy information among multiple data storage devices in an array of data storage devices. Redundancy information enables the reconstruction of contents of a failed data storage device, with or without taking the storage system offline. Redundancy information may be, for example, a mirror copy of the user data (for example, in RAID 1) or parity information (for example, in RAID 5). The mirror copy configuration may be cost prohibitive to implement since both the data and its duplicate are stored, needing twice the storage capacity. A mirroring configuration incurs a storage capacity overhead for redundancy of at least 100%. To provide a system that incurs a lower storage capacity overhead for redundancy, parity may be implemented.

In traditional RAID configurations, without declustering, when a data storage device in the array fails, all (or nearly all, for traditional RAID 6) of the surviving data storage devices in the array are read during a reconstruction/recovery of a single failed data storage device. This allows the configuration to rebuild the failed data storage device's content from the remaining data storage devices. If the system is not, or cannot, be taken offline during reconstruction, user throughput during reconstruction is reduced, and the surviving data storage devices bear an additional load by being read to reconstruct the failed data storage device's content while online. The additional load on the surviving data storage devices during an online rebuilding may slow down the recovery and thereby increase the time needed to perform reconstruction of the failed data storage device's content. A declustered RAID array may improve rebuilding performance.

SUMMARY

Embodiments of the present invention disclose a method, computer program product, and system for managing a declustered redundant array of independent disks (RAID) array of data storage devices. The declustered RAID array is configured to tolerate a predetermined number of failing data storage devices. The declustered RAID array of data storage devices is split into a plurality of regions, each of the plurality of regions is divided into a plurality of sets, and each of the sets of the plurality of sets utilizes a different combination of the data storage devices. The declustered RAID array provisions a plurality of virtual logical unit numbers (LUNs) from respective sets of each of the plurality of regions, and in response to a failure of one or more of the plurality of data storage devices, up to the predetermined number of failing data storage devices, the RAID array rebuilds at least one copy of each of the plurality of virtual LUNs.

BRIEF DESCRIPTION OF THE SEVERAL VIEWS OF THE DRAWINGS

The following detailed description, given by way of example and not intended to limit the invention solely thereto, will best be appreciated in conjunction with the accompanying drawings, in which.

DETAILED DESCRIPTION

A declustered RAID array distributes a RAID geometry over a larger number of data storage devices, which may improve performance when rebuilding. However this means that normal operation of the array may be dependent upon a larger number of data storage devices not failing. For high availability of data it is desirable to have multiple copies of data above the RAID layer. Traditionally, data storage devices may be divided into multiple RAID arrays and mirrored copies of data may be generated for a virtual logical unit number (LUN), one on each array. This means that one copy of the data may survive any single array failure. A virtual LUN is a representation of a storage area that is not tied to any physical storage allocation.

The data storage devices in a declustered RAID array may be divided into multiple separate declustered RAID arrays in order to provide a redundancy that may equate to the traditional approach of a mirror RAID configuration. This may be advantageous for users with large numbers of data storage devices as half the data storage devices may be enough to saturate another part of the system during a rebuild. However, for users without a large number of data storage devices, dividing the data storage devices into two distinct sets halves may slow the rebuild process as this may half the number of data storage devices participating in a rebuild.

According to an embodiment of the invention, a computer implemented method for managing a declustered redundant array of independent disks (RAID) array of data storage devices, where the declustered RAID array may be configured to tolerate a predetermined number of failing data storage devices. The method comprises of splitting a declustered RAID array of data storage devices into a plurality of regions, dividing each of the plurality of regions into a plurality of sets. Each of the plurality of sets may utilize a different combination of data storage devices, which provisions of a plurality of virtual logical unit numbers (LUNs) from respective sets of each of the plurality of regions. In response to a failure of one or more of the plurality of data storage devices, up to the predetermined number of failing data storage devices, the method may rebuild at least one copy of each of the plurality of virtual LUNs.

Addition embodiments of the invention provide a system for managing a declustered redundant array of independent disks (RAID) array of data storage devices. The declustered RAID array may be configured to tolerate a predetermined number of failing data storage devices. A declustered RAID array splitter, which splits the declustered RAID array of data storage devices into a plurality of regions. A region splitter may divide each of the plurality of regions into a plurality of sets, each of the sets may utilize a different combination of data storage devices. A virtual LUN provisioner may provision a plurality of virtual logical unit numbers (LUNs) from respective sets of each of the plurality of regions. A RAID array rebuilder, which in response to a failure of one or more of the plurality of data storage devices, up to a predetermined number of failing data storage devices, may rebuild at least one copy of each of the plurality of virtual LUNs.

Additional embodiments of the invention further provide a computer program product for managing a declustered redundant array of independent disks (RAID) array of data storage devices. A RAID array may be configured to tolerate a predetermined number of failing data storage devices. The computer program product comprises a computer readable storage medium having program embodied instructions. The program instructions may be executable by a computer to cause the computer to split the declustered RAID array of data storage devices into a plurality of regions, divide each of the plurality of regions into a plurality of sets, each of the sets utilizing a different combination of the data storage devices, provision a plurality of virtual logical unit numbers (LUNs) from respective sets of each of the plurality of regions, and in response to a failure of one or more of the plurality of data storage devices, up to the predetermined number of failing data storage devices, rebuild at least one copy of each of the plurality of virtual LUNs.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
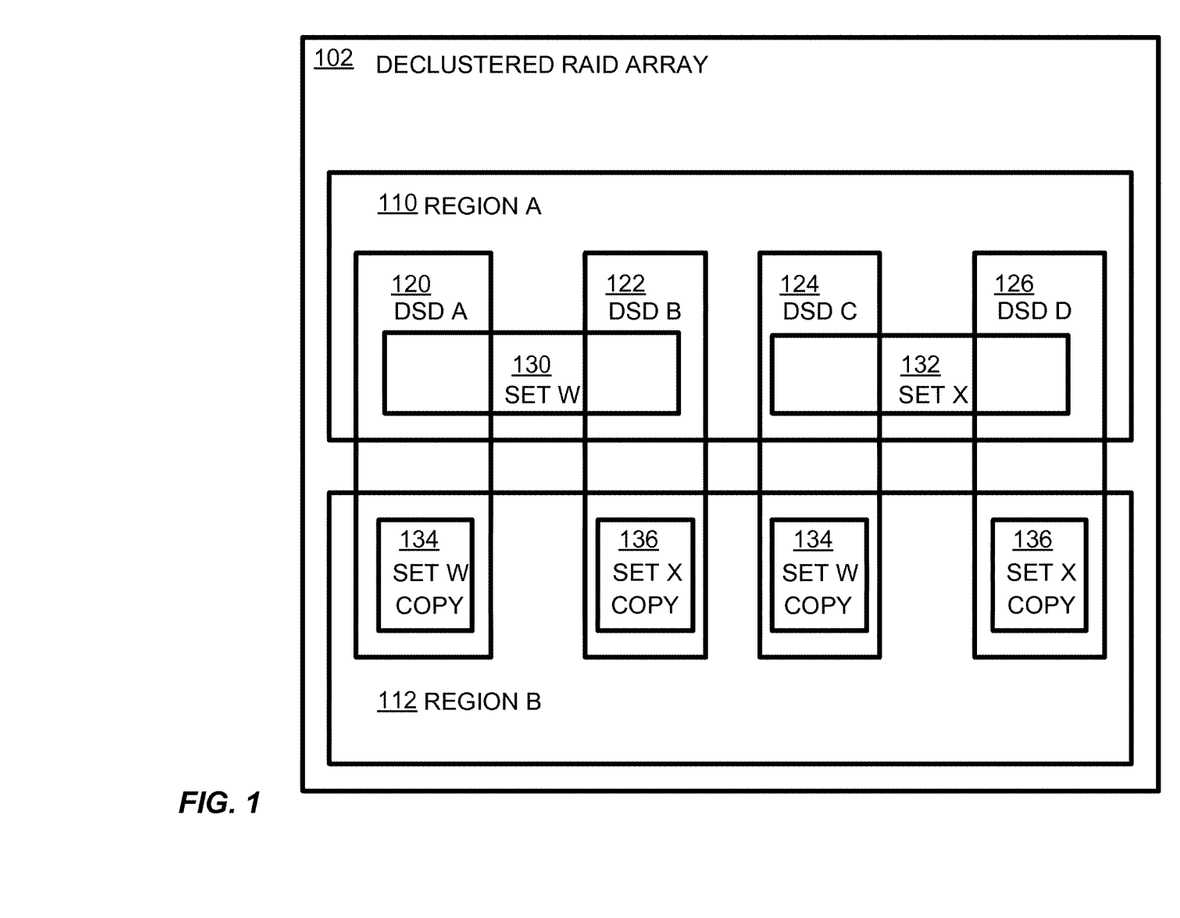
FIG. 1 is a functional block diagram illustrating a declustered RAID array, in accordance with an embodiment of the present invention.

Embodiments of the present invention will be described with reference to the Figures. Referring to FIG. 1, FIG. 1 is a functional block diagram illustrating a declustered RAID array 102, split into regions 110, 112. Regions 110 and 112 both comprise a portion of each one of a plurality of data storage devices 120-126 that make up the declustered RAID array 102. Region 110 and 112 are divided into a plurality of sets 130-136 of data storage devices. In the exemplary embodiment, set W 130 comprises a portion of each of DSD A 120 and DSD B 122 which is in region A 110. Set X 132 comprises a portion of each of DSD C 124 and DSD D 126 which is also in region A 110. Set W COPY 134 comprises a portion of each of DSD A 120 and DSD C 124 which is in region B 112. The two portions of SET W COPY 134 shown in FIG. 1 may be taken together to form SET W COPY 134. Set X COPY 136 comprises a portion of each of DSD B 122 and DSD D 126 which is in region B 112. The two portions of SET X COPY 136 shown in FIG. 1 may be taken together to form SET W COPY 136. Set W COPY 134 is a copy of SET W 130 and set X COPY 136 is a copy of set X 132. Although the exemplary embodiment described above has two regions 110, 112 two sets 130-136 and four data storage devices 120-126, embodiments of the invention may use any number of regions 110, 112, sets 130-136 or data storage devices 120-126.

Virtual LUNs are provisioned from any of sets 130-136 of the region 110, 112 and are not dependent on the data storage devices 120-126 in the other sets 130-136 in the region 110, 112. For example, a first virtual LUN may be provisioned from set W 130, with a copy of that virtual LUN being provisioned from SET W COPY 134. A second virtual LUN may be provisioned from set X 132, with a copy of that virtual LUN being provisioned from SET X COPY 136. If the RAID array comprised only a single region 110, then effectively the data storage devices 120-126 may split into two separate declustered RAID arrays 102. However, as each region, 110 and 112, divide the data storage devices 120-126 into sets 130-136 using a different pattern, the result may be that as the number of regions 110, 112 increases the rebuild performance approaches that of a typical declustered RAID array 102.

A RAID 5 array may comprise block-level striping with parity distributed among the data storage devices 120-126. This configuration may require that all data storage devices 120-126 but one be present to operate. Upon failure of a single data storage device 120-126, subsequent reads may be calculated from the distributed parity such that no data is lost. A RAID 6 array is a RAID 5 array with the addition of a second parity block, using block-level striping with two parity blocks distributed across all member data storage devices.

Figure 2:
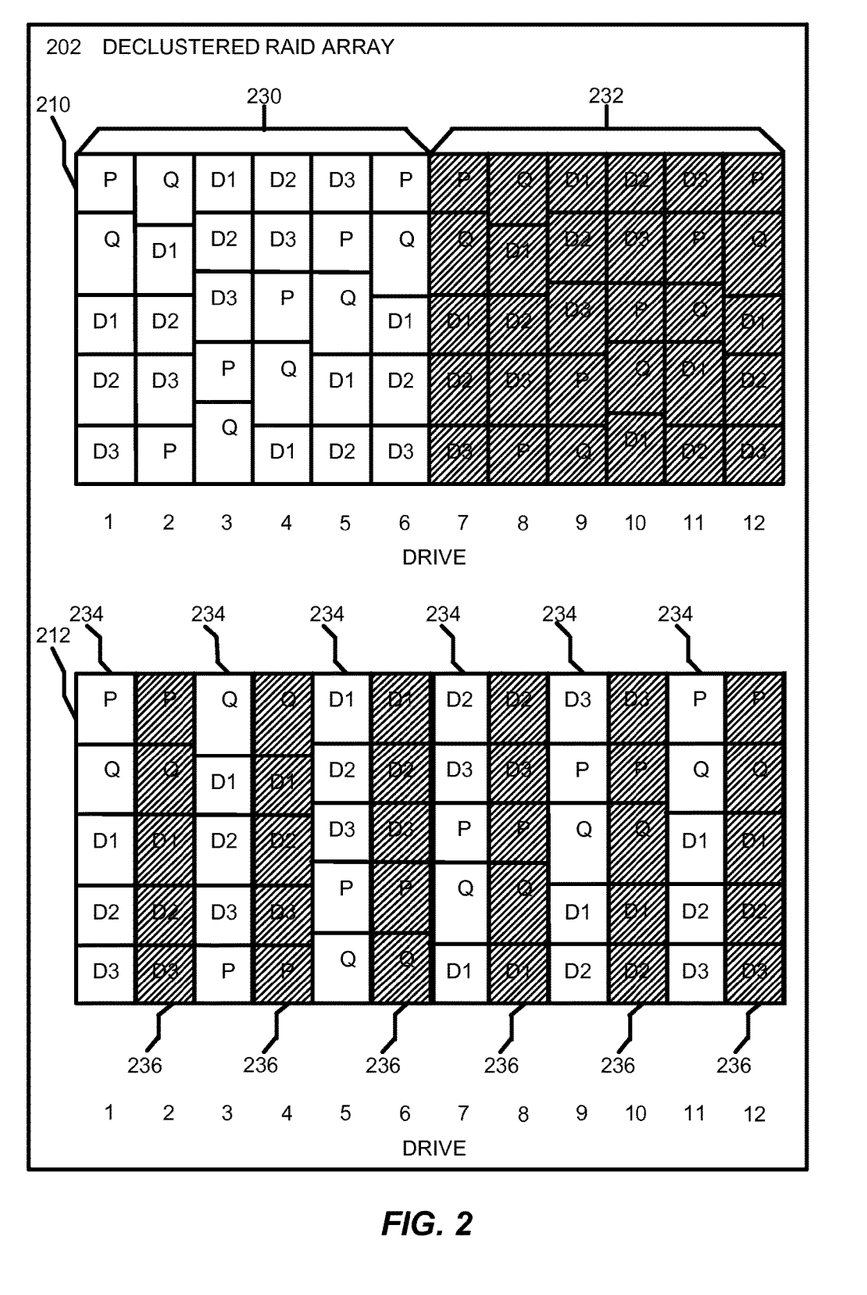
FIG. 2 is a functional block diagram illustrating a declustered RAID array and virtual logical unit number configuration, in accordance with an embodiment of the present invention.

Referring now to FIG. 2, FIG. 2 is a functional block diagram illustrating declustered RAID 6 array 202 with twelve data storage devices (DRIVES 1-12) in a RAID 6 configuration, in accordance with an embodiment of the present invention. RAID 6 array 202 comprises three data stripes D1, D2, D3 plus two parity strips P, Q per stride. Strides are segments of sequential data, such that, for example, D1, D2, D3, P, and Q may be written to or read from a data storage device 1-12 before the operation continues on the next data storage device 1-12. RAID 6 array 202 is divided into two regions 210 and 212, each of which may be subdivided into two sets 230-236. Set 232 and set 236 may be represented by Set X 132 and Set X Copy 136 of FIG. 1. Region 210 is split into two sets 230, 232 left and right and region 112 is split into two sets 234, 236 using odd and even drive numbers. The split between two sets 230-236 may be in these patterns or in any other patterns.

Referring to FIGS. 1 and 2, a virtual logical unit number, or LUN, provisioned from any set 230-236 in region 210 or region 212, is independent of any virtual LUN provisioned from the other set 230-236 of the same regions 210 or 212. For example, a virtual LUN provisioned from set W 130 in region A 110 is independent of a virtual LUN provisioned from set X 132, or set 232, in region A 110, or region 210, and a virtual LUN provisioned from set W COPY 134, or set 234, in region B 112, or region 212, is independent of a virtual LUN provisioned from set X COPY 136, or set 236, in region B 112, or 212. In an embodiment, a regions of FIGS. 1 and 2 comprise a contiguous range of physical Logical Block Addresses (LBAs). In another embodiment, a regions of FIGS. 1 and 2 comprise a non-contiguous range of physical Logical Block Addresses (LBAs). Although the exemplary embodiment of FIG. 2 shows twelve data storage devices, two regions 210 and 212, each divided into two sets 230-236, any number of data storage devices, regions, or sets may be used in embodiments of the invention.

In an exemplary embodiment, the declustered RAID 6 array 202 supports two virtual LUNs. LUN A is provisioned from region 210 with two copies, one from set 230, and one from set 234, shown hatched in FIG. 2. LUN B is provisioned from region 212 with two copies, one from set 232, and one from set 236. Although the example of FIG. 2 shows one LUN configuration from a set split left and right and one LUN configured from a set split using odd and even numbered data storage devices, other configurations may be used in place of these or in addition to these configurations.

A failure of any data storage devices in the declustered RAID 6 array 202 may still leave one copy of LUN A and one copy of LUN B available. For example, following a failure of drives 1, 2 and 3 in FIG. 2, the contents of set 230 may be rebuilt using the content of set 234 stored on drives 11 and 5, together with the content of set 230 on drives 4 to 6. As another example, following a failure of drives 5, 10 and 12 in FIG. 2, the contents of set 230 may be rebuilt using the contents of set 230 on drives 1 to 4 and 6 and the contents of set 232 may be rebuilt using the contents of set 236 on drive 8 together with the contents of set 232 on drives 7 to 9 and 11.

In various embodiments, following a failure of a single data storage device, the rebuild process may take advantage of the distributed nature of the declustered RAID 6 array 202 and reconstructs the missing data by reading from a larger set of the remaining disks. For example, if DRIVE 1 were to fail, region 210 may rebuild DRIVE 1 by reading from DRIVES 2, 3, 4, 5, and 6 and region 212 rebuilds DRIVE 1 by reading from DRIVES 3, 5, 7, 9 and 11. In embodiments of the present invention, the process of rebuilding uses eight data storage devices as opposed to the five data storage devices used in a process of rebuilding if this were a single data storage device failing in a system where the data storage devices were split into two arrays (declustered or not) to provide for volume mirroring. In an embodiment, more regions may be having different patterns, and may improve the rebuild performance.

As will be familiar to persons skilled in the art, two different syndromes need to be computed for the parity bits P, Q in order to allow the loss of more than one data storage device 120-126 (FIG. 1). One of them, P can be the infix operator XOR of the data across the stripes, as is used with RAID 5. A second may be an independent syndrome based on Reed-Solomon encoding.

Figure 3:
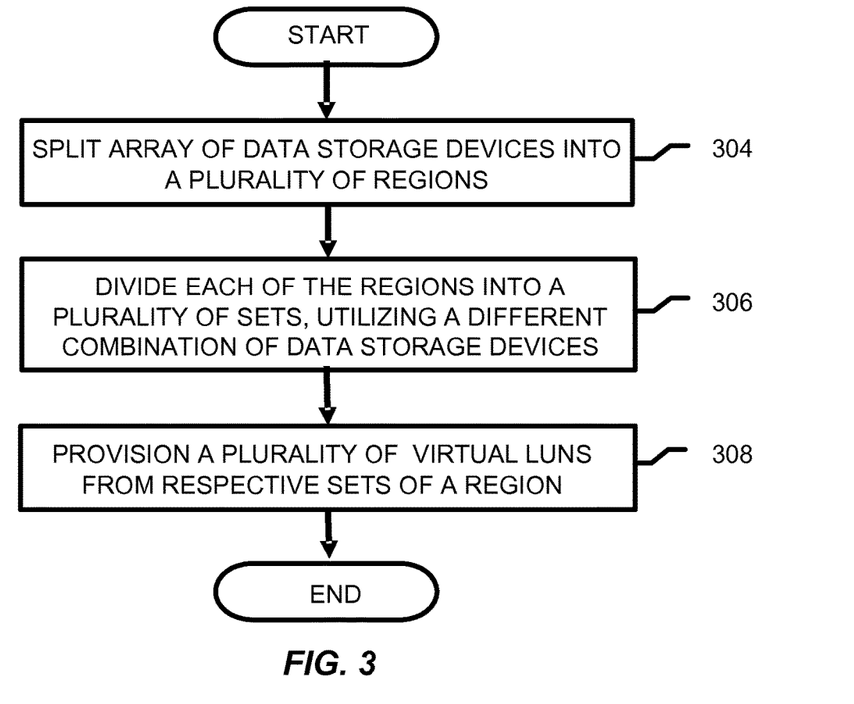
FIG. 3 is a flowchart depicting operational steps of managing a declustered RAID array of data storage devices, in accordance with an embodiment of the present invention.

Referring to FIGS. 1 and 3, FIG. 3 is a flowchart depicting operational steps of managing a declustered RAID array of data storage devices, for example data storage devices 120-126 (FIG. 1), in accordance with an embodiment of the present invention. The method of managing a declustered RAID array 202 is shown in FIG. 2 as region 210 in the upper portion of FIG. 2 and region 212 in the lower portion of FIG. 2. At step 304, the declustered RAID array 202 of data storage devices is split into a plurality of regions 210 and 212. At step 306, each of the plurality of regions 210 and 212 is divided into a plurality of sets 230-236, each of the sets 230-236 utilizing a different combination of the data storage devices, shown in FIG. 2 as set 230 and set 232 in region 210 and set 234 and set 236 in region 212. At step 308, a plurality of virtual LUNs is provisioned from respective sets 230-236 of each of the plurality of regions 210 and 212.

Figure 4:
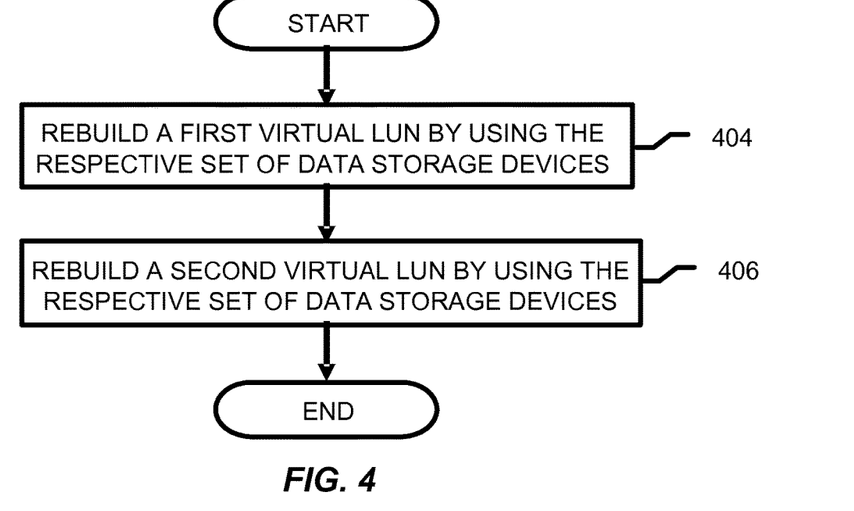
FIG. 4 is a flowchart depicting operational steps of rebuilding a declustered RAID array of data storage devices, in accordance with an embodiment of the present invention.

FIG. 4 is a flowchart depicting operational steps of rebuilding a declustered RAID 6 array 202 of data storage devices, in accordance with an embodiment of the present invention. Referring to FIGS. 2 and 4, at step 404, in response to a failure of one or more of the plurality of data storage devices, up to a predetermined number of failing data storage devices, at least one copy of each of the plurality of virtual LUNs is rebuilt. A first virtual LUN is rebuilt using a respective set 230-236 of data storage devices as described above with reference to FIG. 2. Set 234 may be used rebuild the content of set 230. At step 406, a second virtual LUN is rebuilt using a respective sets 230-236 of data storage devices as described above with reference to FIG. 2. Set 236 may be used to rebuild the content of set 232.

Various embodiments of the invention provide an arrangement of stripes in a declustered or distributed RAID array so that a mirrored volume may be stored within a single array without the loss of the extra redundancy that is provided by the mirroring. Various embodiments of the invention may not impact the performance and rebuild time of the RAID array and may result in better performance characteristics than a configuration of mirroring a volume across two independent declustered or distributed arrays, with each array having half the total number of drives.

Various embodiments of the invention may provide an advantage over a RAID 51 or a RAID 61 array in that a RAID 51 array or a RAID 61 array mirrors all data stored in the array. This may gain protection against data loss but halves the capacity of the array. Various embodiments of the invention allow the system and user to selectively choose which volumes of the array to mirror and to store selected mirrored volumes alongside the non-mirrored volumes. The particular data storage devices may be pooled into one large many-to-many recovery network rather than being partitioned into mirrored and non-mirrored areas that must be recovered independently.

Figure 5:
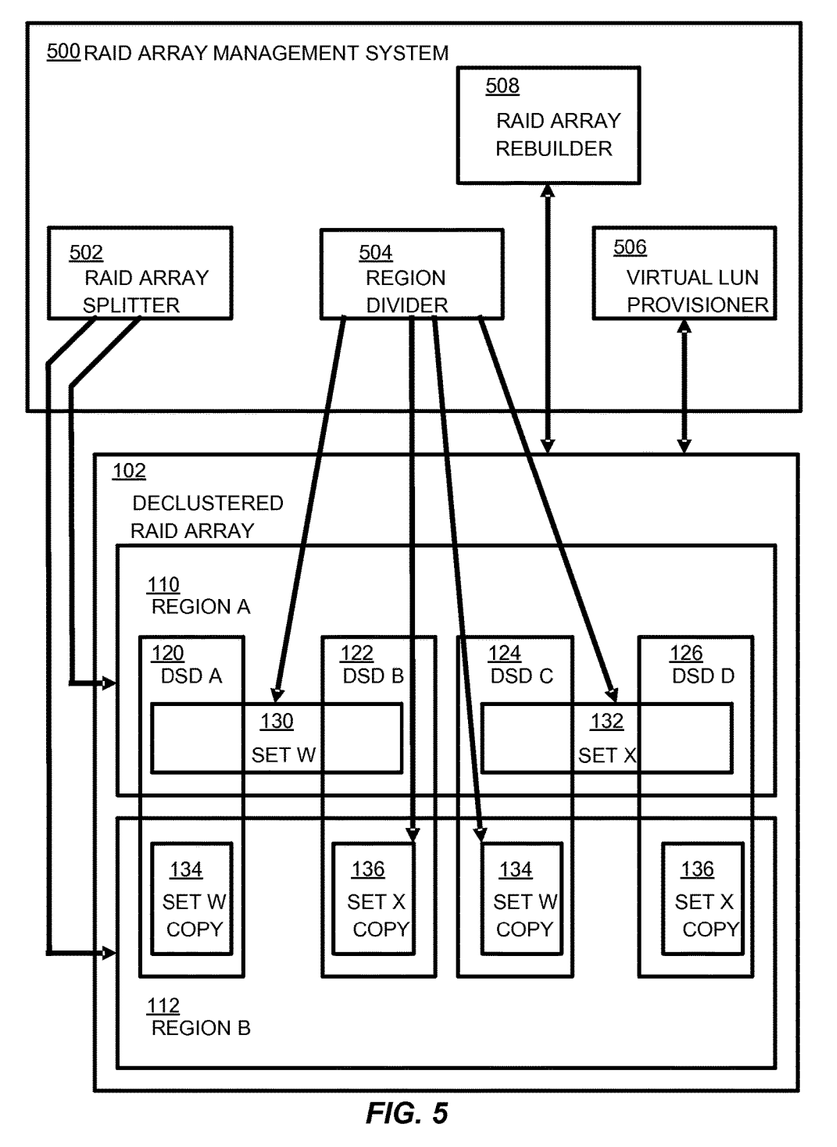
FIG. 5 is a functional block diagram illustrating a computer system managing a declustered RAID array of data storage devices, in accordance with an embodiment of the invention

FIG. 5 is a functional block diagram illustrating a computer system managing a declustered RAID array 102 of data storage devices, of FIG. 1, generally designated RAID array management system 500. In various embodiments, the declustered RAID array 102 may be configured to tolerate a predetermined number of failing data storage devices 120-126. Declustered RAID array splitter 502 splits the declustered RAID array 102 of data storage devices 120-126 into a plurality of regions 110 and 112. Region divider 504 divides each of the plurality of regions into a plurality of sets, each of the sets utilizing a different combination of the data storage devices. Virtual LUN provisioner 506 provisions a plurality of virtual logical unit numbers (LUNs) from respective sets 130-136 of each of the plurality of regions 110 and 112. RAID array rebuilder 508, in response to a failure of one or more of the plurality of data storage devices 120-126, up to the predetermined number of failing data storage devices 120-126, rebuilds at least one copy of each of the plurality of virtual LUNs.

Figure 6:
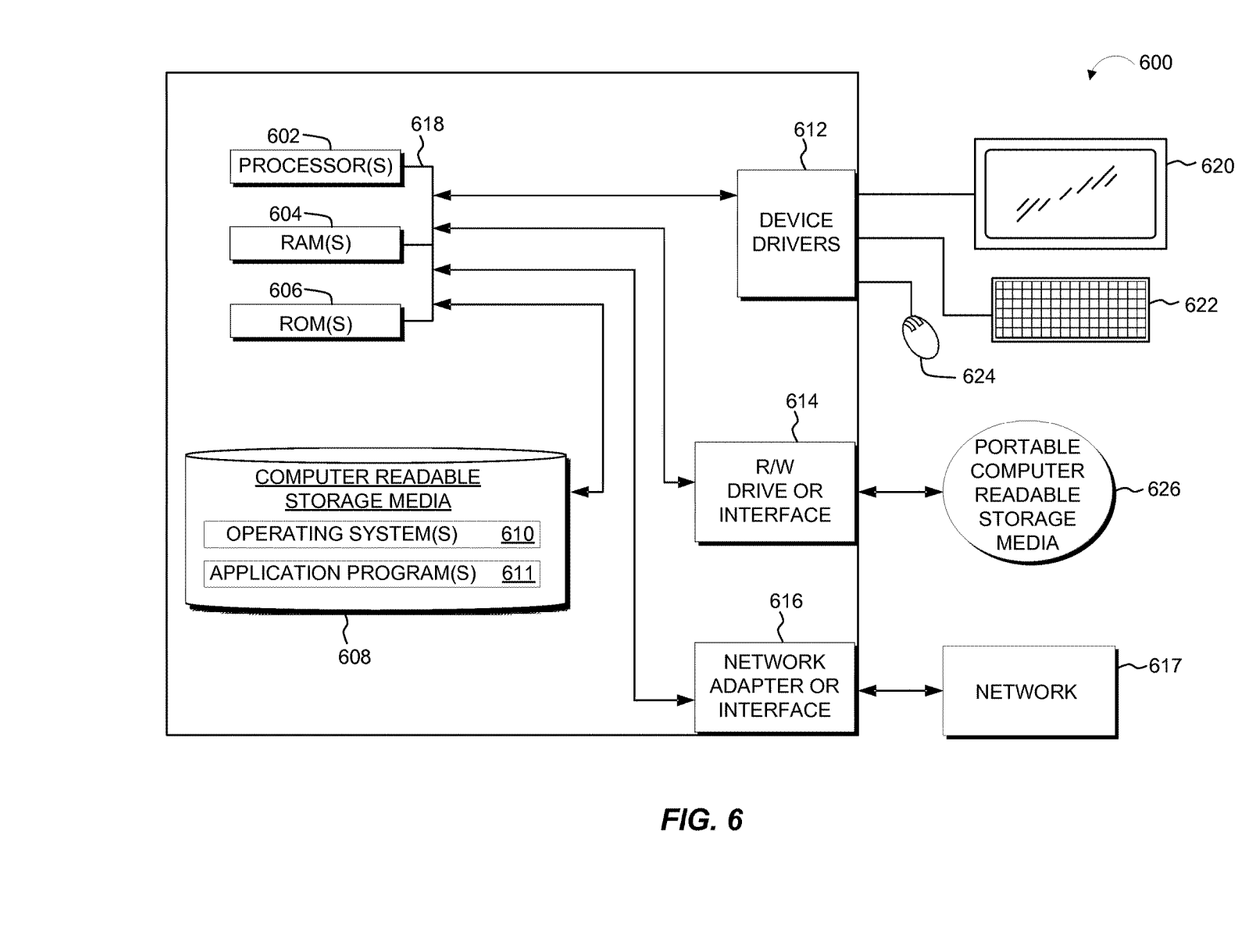
FIG. 6 depicts a block diagram of components of a computer system, in accordance with an embodiment of the present invention.

FIG. 6 depicts a block diagram of components of a computing device, generally designated as computing device 600, in accordance with an embodiment of the present invention. It should be appreciated that FIG. 6 provides only an illustration of one implementation and does not imply any limitations with regard to the environments in which different embodiments may be implemented. Many modifications to the depicted environment may be made, but it should be appreciated that computing device 600 is capable of being implemented and/or performing any of the functionality described above.

Computing device 600 may include one or more processors 602, one or more computer-readable RAMs 604, one or more computer-readable ROMs 606, one or more computer readable storage media 608, device drivers 612, read/write drive or interface 614, network adapter or interface 616, all interconnected over a communications fabric 618. Communications fabric 618 may be implemented with any architecture designed for passing data and/or control information between processors (such as microprocessors, communications and network processors, etc.), system memory, peripheral devices, and any other hardware components within a system.

One or more operating systems 610, and one or more application programs 611, are stored on one or more of the computer readable storage media 608 for execution by one or more of the processors 602 via one or more of the respective RAMs 604 (which typically include cache memory). In the illustrated embodiment, each of the computer readable storage media 608 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 600 may also include a R/W drive or interface 614 to read from and write to one or more portable computer readable storage media 626. Application programs 611 on computing device 600 may be stored on one or more of the portable computer readable storage media 626, read via the respective R/W drive or interface 614 and loaded into the respective computer readable storage media 608.

Computing device 600 may also include a network adapter or interface 616, such as a TCP/IP adapter card or wireless communication adapter (such as a 4G wireless communication adapter using OFDMA technology) for connection to a network 617. Application programs 611 on computing device 600 may be downloaded to the computing device from an external computer or external storage device via a network (for example, the Internet, a local area network or other wide area network or wireless network) and network adapter or interface 616. From the network adapter or interface 616, the programs may be loaded onto computer readable storage media 608. The network may comprise copper wires, optical fibers, wireless transmission, routers, firewalls, switches, gateway computers and/or edge servers.

Computing device 600 may also include a display screen 620, a keyboard or keypad 622, and a computer mouse or touchpad 624. Device drivers 612 interface to display screen 620 for imaging, to keyboard or keypad 622, to computer mouse or touchpad 624, and/or to display screen 620 for pressure sensing of alphanumeric character entry and user selections. The device drivers 612, R/W drive or interface 614 and network adapter or interface 616 may comprise hardware and software (stored on computer readable storage media 608 and/or ROM 606).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A computer implemented method for managing a declustered redundant array of independent disks (RAID) array of data storage devices, the declustered RAID array configured to tolerate a predetermined number of failing data storage devices, the method comprising:
   splitting the declustered RAID array of data storage devices into a plurality of regions, wherein each of the plurality of regions is divided into two sets, wherein, in a first region, the sets comprise a first, lower numbered half of data storage devices and a second, higher numbered half of the data storage devices and in a second region, the sets comprise a first, odd numbered half of the data storage devices and a second, even numbered half of the data storage devices, each set of the two sets utilizing a different combination of the data storage devices, wherein the declustered RAID array of data storage devices comprising a count of data storage devices above a predetermined threshold;
   provisioning a plurality of virtual logical unit numbers (LUNs) from respective sets of each of the plurality of regions; and
   in response to a failure of one or more of the plurality of data storage devices, up to the predetermined number of failing data storage devices, rebuilding at least one copy of each of the plurality of virtual LUNs, wherein rebuilding further comprises saturating a second set of data storage devices of the two sets of data storage devices with a first set of data storage devices of the two sets of data storage devices, in order to improve performance.

2. The method of claim 1, wherein the RAID array is a RAID 6 array having two parity bits.

3. The method of claim 1, wherein two virtual LUNs are provisioned.

4. A computer program product for managing a declustered redundant array of independent disks (RAID) array of data storage devices, the declustered RAID array configured to tolerate a predetermined number of failing data storage devices, the computer program product comprising:
   a computer-readable storage media having program instructions stored on the computer-readable storage media, the program instructions, executable by a device, comprising:
   instructions to split the declustered RAID array of data storage devices into a plurality of regions, wherein each of the plurality of regions is divided into two sets, wherein, in a first region, the sets comprise a first, lower numbered half of data storage devices and a second, higher numbered half of the data storage devices and in a second region, the sets comprise a first, odd numbered half of the data storage devices and a second, even numbered half of the data storage devices, each set of the two sets utilizing a different combination of the data storage devices, wherein the declustered RAID array of data storage devices comprising a count of data storage devices above a predetermined threshold;
   instructions to provision a plurality of virtual logical unit numbers (LUNs) from respective sets of each of the plurality of regions; and
   in response to a failure of one or more of the plurality of data storage devices, up to the predetermined number of failing data storage devices, instructions to rebuild at least one copy of each of the plurality of virtual LUNs, wherein instructions to rebuild further comprise instructions to saturate a second set of data storage devices of the two sets of data storage devices with a first set of data storage devices of the two sets of data storage devices, in order to improve performance.

5. The computer program product of claim 4, wherein the RAID array is a RAID 6 array having two parity bits.

6. The computer program product of claim 4, wherein two virtual LUNs are provisioned.

7. A computer system for managing a declustered redundant array of independent disks (RAID) array of data storage devices, the declustered RAID array configured to tolerate a predetermined number of failing data storage devices, the computer system comprising:
   one or more computer processors;
   one or more computer-readable storage media;
   program instructions stored on the computer-readable storage media for execution by at least one of the one or more processors, the program instructions comprising:
   instructions to split the declustered RAID array of data storage devices into a plurality of regions, wherein each of the plurality of regions is divided into two sets, wherein, in a first region, the sets comprise a first, lower numbered half of data storage devices and a second, higher numbered half of the data storage devices and in a second region, the sets comprise a first, odd numbered half of the data storage devices and a second, even numbered half of the data storage devices, each set of the two sets utilizing a different combination of the data storage devices, wherein the declustered RAID array of data storage devices comprising a count of data storage devices above a predetermined threshold;
   instructions to provision a plurality of virtual logical unit numbers (LUNs) from respective sets of each of the plurality of regions; and
   in response to a failure of one or more of said plurality of data storage devices, up to the predetermined number of failing data storage devices, instructions to rebuild at least one copy of each of said plurality of virtual LUNs, wherein instructions to rebuild further comprise instructions to saturate a second set of data storage devices of the two sets of data storage devices with a first set of data storage devices of the two sets of data storage devices, in order to improve performance.

8. The computer system of claim 7, wherein the RAID array is a RAID 6 array having two parity bits.

9. The computer system of claim 7, wherein two virtual LUNs are provisioned.

* * * * *